UNITED STATES PATENT OFFICE.

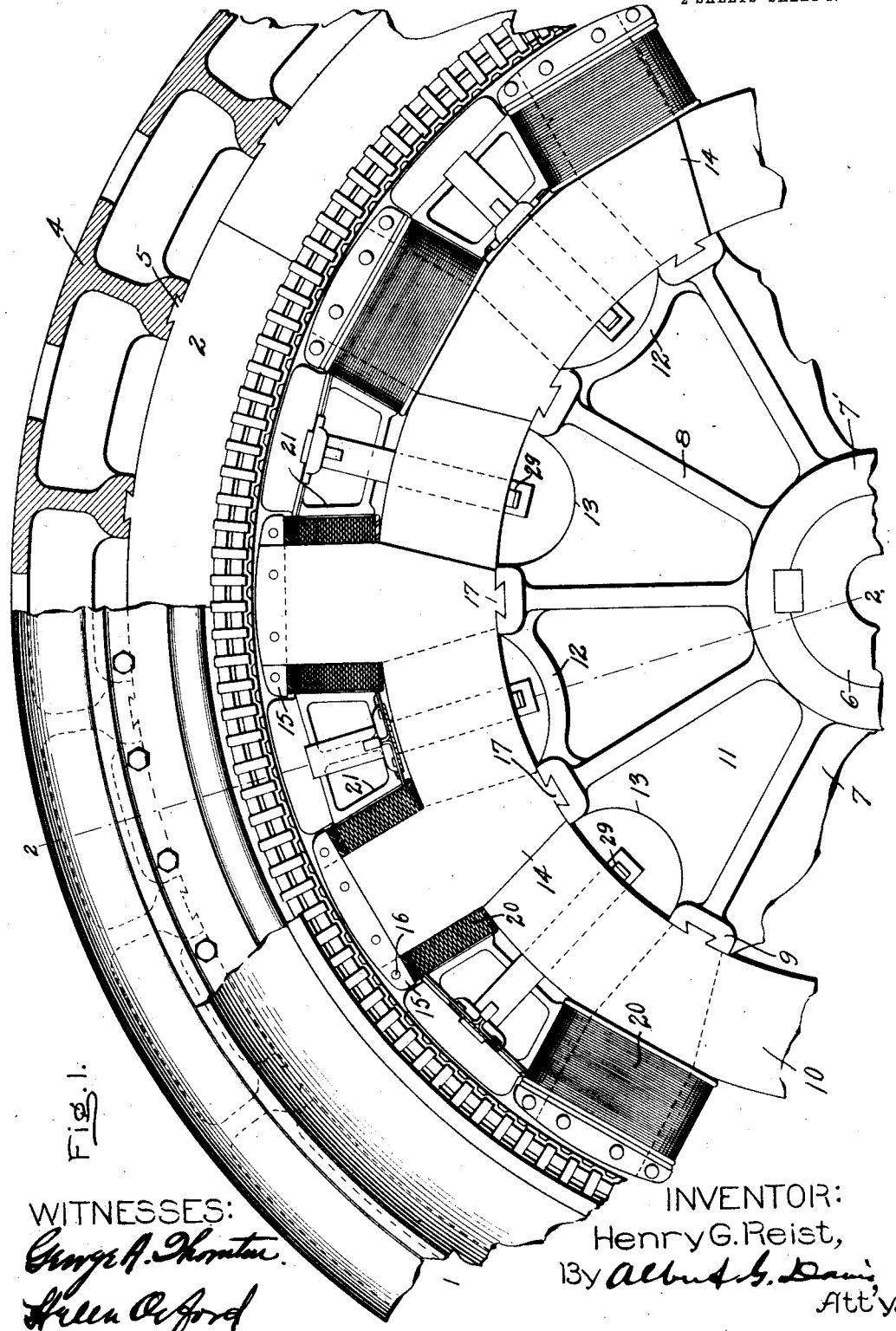

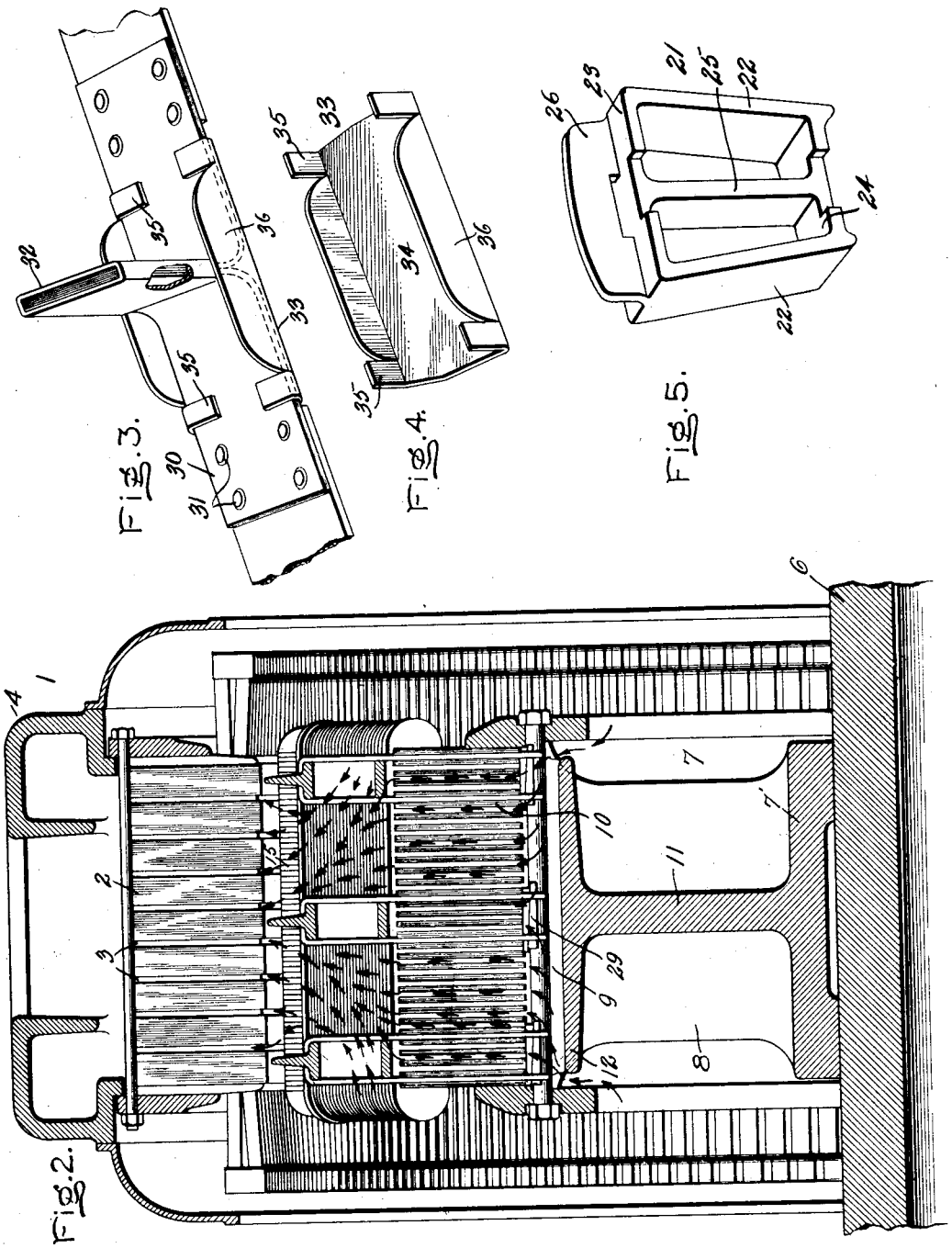

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE.

996,883.  Specification of Letters Patent.  Patented July 4, 1911.

Application filed March 1, 1905. Serial No. 247,849.

*To all whom it may concern:*

Be it known that I, HENRY G. REIST, a citizen of the United States, residing at Schenectady, county of Schenectady, State of New York, have invented certain new and useful Improvements in Dynamo-Electric Machines, of which the following is a specification.

My present invention relates to dynamo electric machines, and more particularly to the construction and arrangement of the rotating members of dynamo electric machines.

The invention consists in a spider of novel construction for the revolving member of a dynamo electric machine suitable for use in the rotating member of many different types of machines, and in certain features of construction and arrangement of parts particularly adapted for use with revolving fields of dynamo electric machines.

The various features of novelty which characterize my invention are pointed out with particularity in the claims annexed to and forming a part of this specification. For a better understanding of my invention, however, reference may be had to the accompanying drawings and description in which I have illustrated and described one of the forms in which my invention may be embodied.

Of the drawings, Figure 1 is an end elevation with parts broken away and in section of a portion of a dynamo electric machine; Fig. 2 is a section on the line 2—2 of Fig. 1; Fig. 3 is a perspective view of the means employed for connecting the terminals of adjacent field magnet windings; Fig. 4 is a perspective view showing a part used in the connecting means shown in Fig. 3; and Fig. 5 is a perspective view showing a field coil winding support or bracket.

Referring to the drawings, 1 represents the external armature of an internal revolving field alternator. The armature core is composed of laminæ 2 arranged in groups separated to form ventilating spaces or passages 3. The laminæ are secured to the external ring-shaped frame 4 by the usual tongue and slot connections 5.

The internal revolving field is carried on a shaft 6 mounted in suitable bearings (not shown). On the shaft 6 is mounted a spider 7. The spider 7 comprises a solid hub portion 7' from which extend radial arms 8. In the construction shown in the drawings, the arms 8 are substantially rectangular in cross-section, each of a width measured parallel to the armature shaft slightly less than the thickness of the armature core, and of a thickness equal to a small fraction of the width of an arm. The outer ends of the arms are expanded at 9. The outer surfaces of the expanded ends 9 of the arms are machined concentrically with the shaft to form supports for the inner periphery of the laminated annular core 10.

Each adjacent pair of arms 8 are connected by a comparatively thin web portion 11 extending transversely to the shaft 6. Preferably the web portion between certain pairs of arms is supplemented by a web portion 12 connecting the extended portion 9 of those arms. The web portion 12 may have its outer surface concave as shown, and extends perpendicularly to the web portion 11. The web portion 12 is preferably omitted between other adjacent pairs of arms 8. In the construction shown in the drawings alternate pairs only of arms 8 are connected by web portions 12. Frequently I prefer to have the web portion 11 between adjacent arms unconnected by a web portion 12 not extend outward to the inner periphery of the core, but to terminate in the inwardly concaved surface 13.

The field core 10 is built up of laminæ 14 which are preferably connected to the extended ends 9 of the arms 8 by tongue and slot connections. In the particular construction illustrated in the drawing the laminæ 14 are substantially U shaped, each being provided with two polar portions or projections one of which forms part of one field pole, and the other, part of an adjacent field pole. These laminæ are arranged in bundles which are alternately reversed with respect to each other so that the opposite ends of the successive bundles of laminæ forming part of one pole piece form part of each adjacent pole piece. As a result the core body between the pole pieces is composed of alternate spaces and bundles of laminæ. One of the polar projections on each bundle of laminæ is shorter than the other. The spaces between the longer laminæ in each pole piece are filled with pole tip pieces 15. The pole tip pieces 15 are secured to the core by bolts 16.

The field core construction thus far described forms no part of my present invention and has already been claimed in my Letters Patent, No. 896,323, dated Aug. 18, 1908.

In the construction shown in the drawings each of the laminæ is formed with two dovetail projections or tenons 17. These projections fit in undercut grooves formed to receive them in the expanded ends 9 of the arms 8. Each field coil or winding 20 is placed over the corresponding polar projection before the pole tip pieces 15 are put in place. After the field coils of the windings are in place the pole tip pieces, which are longer than the thickness of the pole piece proper, are put in place and properly secured by bolts or rivets 16.

In order to prevent a bulging out or a spreading of elongated sides of the coils or windings 20, braces, brackets or supports 21 are placed between the sides of adjacent windings. In the construction shown in the drawings each brace 21 comprises two side pieces 22, each of which is parallel to the outer surface of the winding against which it bears and consequently is inclined to the other side piece. These are connected by top and bottom members 23 and 24 which in turn may be connected by a stiffening member 25 if desired. A radially extending portion 26 from the upper side of the member 23 extends outward and has its outer surface substantially concentric with the armature shaft and separated from the inner periphery of the armature core by an air gap or space substantially equal to the air gap between the ends of the poles and the armature core. The brackets or supports 21 are secured in place by U-shaped straps of metal which pass through openings formed for the purpose in the wings 26 above the members 23. The legs of the U-shaped strap pass downward through the appropriate spaces in the magnet yoke and are secured in place by keys or wedges 29 which bear against the inner periphery of the field magnet body. It will be observed that each coil support is thus made independently removable.

The ends or terminals of the windings of adjacent field poles to be connected together may advantageously be in the form of metal straps 30 which may either be extensions of the windings themselves or may be secured thereto in any suitable manner as by rivets 31, as shown in the drawings. The adjacent ends of the strap portions 30 which are to be connected together are at right angles to the body portions of the straps and extend radially, and are secured together in any suitable manner as by soldering them to each other and to an inclosing shell or casing 32. In order to prevent rupture of the joint between adjacent straps 30 I have found it desirable to employ a trough-shaped supporting member or device 33. This trough-shaped member, which is preferably formed of sheet metal, comprises a body portion 34 which is held in firm engagement with the smooth sides of the connected straps 30 by means of integral ears 35 which are turned over on the bodies of the straps 30. The ears 35 are arranged in the form shown in the drawings one at each corner of the member 33. Between the pair of projections 35 at each side of the connected straps 30 is an integral portion 36 which extends transversely to the axis of rotation of the field magnet and is turned up against the radially extending ends of the straps 30. With this construction the connections are very materially stiffened in the direction necessary to resist rupture from the centrifugal forces generated by the rotation of the revolving field.

It will be observed that the spider construction which I have illustrated and described is one which may be readily formed of cast metal. Each pair of arms 8 connected by a web portion 12 may be regarded, mechanically speaking, as forming practically one arm or spoke. Adjacent arms or spokes so formed are connected by a web portion 11 which is so shaped and arranged that serious stresses are not produced in cooling after casting. It will thus be observed that each pair of arms connected by a web portion 12 possess the advantages, so far as casting is concerned, possessed by spiders, the arms of which are separate and are not connected by an integral rim portion, while at the same time the intervening web portions 11 give them a mechanical stiffness which is highly important and which they would not otherwise have. Owing to the shape and arrangement of the web portion 11 between the adjacent arms 8 connected by web portions 12 little difficulty is experienced from stresses in the material produced from the cooling after casting. While mechanically speaking each pair of arms connected by the web portion 12 might be regarded as forming a spoke it will be observed that each arm 8 is directly connected to and supports the laminated field magnet core.

The rapid rotation of the field magnet occurring in operation generates strong air currents. By shaping the wing portions 26 of the coil supports in the manner shown and described some of the air set in motion by the revolving field is compelled to flow outward through the ventilating spaces 3 in the armature. Owing to centrifugal force the air set in motion moves outward against the inner periphery of the armature core. When the wings 26 are omitted there is a tendency for much of the air set in motion by the movement of the revolving field to move axially along the inner periphery of the armature core out of the spaces between adjacent field poles. The wings between adjacent pole pieces near the inner periphery of the armature core and the pole pieces form pockets which prevent any movement of the air except in a radial direction. With this construction an air pressure is produced which causes a very considerable and very effective flow of air through the ventilating spaces in the armature core and consequent ventilation of the armature.

While in the accompanying drawings and descriptive matter I have in accordance with the requirements of the statutes illustrated the best embodiment of my invention now known to me, it will be obvious to all those skilled in the art that many changes may be made in the form of my invention without departing from its spirit, and that certain features of my invention may be used without using other features thereof.

What I claim as new and desire to secure by Letters Patent of the United States, is,—

1. In a revolving field structure, polar portions, windings surrounding said polar portions, and a brace engaging the adjacent sides of the windings surrounding adjacent polar portions, said brace having a portion extending between the tips of the corresponding polar portions which serves as a barrier to limit the axial flow of air in the space between said polar portions.

2. In a revolving field structure, outwardly extending polar portions having ventilating spaces between them, and wings or barriers located in planes transverse to the axis of rotation extending between adjacent polar portions at the outer ends thereof.

3. A spider, comprising a plurality of radially extending arms, a radial web portion between each adjacent pair of arms, a web portion transverse thereto connecting the outer ends of alternating pairs of adjacent arms, a laminated core, and connections between said core and each of said arms.

4. In a dynamo electric machine, a rotating body, windings thereon the terminals of which are connected together, each terminal comprising a radially extending end portion and a body portion substantially at right angles thereto, the radial ends of adjacent terminals being placed side by side and connected together, and a stiffening device for each connection trough-shaped in form, the connected terminals and the stiffening device being assembled with the bodies of the terminals located in the trough of the stiffening device and the sides of the stiffening device extending parallel to the radial edges of the radial ends of the terminals.

5. A revolving field magnet structure provided with radially extending polar portions and windings thereon, terminals for connecting together adjacent windings, each terminal comprising a radially extending end portion and a body portion substantially at right angles thereto, and a stiffening device in the form of a metal trough-shaped piece, the bodies of the terminals to be connected together being placed in the trough and the sides of the trough bearing against the radial edges of the radial portions of the terminals.

6. In a dynamo electric machine, an external armature formed with ventilating passages, an internal revolving field provided with radially extending pole pieces having ventilating spaces between them, and wings or barriers located in planes transverse to the axis of rotation and extending between adjacent poles at the outer ends thereof.

7. In a dynamo electric machine, a revolving field having radially projecting pole pieces having ventilating spaces between them, and barriers extending between poles at their outer ends to prevent a flow of air in the spaces between the pole tips parallel to the axis of rotation of the field.

8. In a dynamo electric machine, an internal revolving field magnet provided with radially extending polar pieces, and a wing or barrier located adjacent each end of the magnet in a plane transverse to the axis of rotation and extending between the tips of an adjacent pair of poles.

9. In a dynamo electric machine, a spider comprising a plurality of radially extending arms, webs transverse to the axis of rotation of the spider connecting each adjacent pair of arms, web portions extending perpendicular to the first mentioned web portion, connecting the outer ends of certain pairs of said arms, and a laminated core carried by said arms and directly connected to each of them.

10. In a dynamo electric machine, an internal revolving field magnet provided with radially extending poles having ventilating spaces between them, and a vane or barrier located in each of said ventilating spaces and extending between the tips of the poles in a plane transverse to the axis of rotation to prevent a flow of air in the spaces between the pole tips parallel to the axis of rotation of the field.

11. In a dynamo electric machine, an external armature formed with ventilating passages, an internal revolving field magnet provided with radially extending poles and ventilating spaces between the poles, and vanes or barriers located in said ventilating spaces and extending between the outer ends of the poles in planes transverse to the axis of rotation to prevent a flow of air in the spaces between the pole tips parallel to the axis of rotation of the field.

In witness whereof, I have hereunto set my hand this 16th day of February 1905.

HENRY G. REIST.

Witnesses:
BENJAMIN B. HULL,
HELEN ORFORD.

Copies of this patent may be obtained for five cents each, by addressing the "Commissioner of Patents, Washington, D. C."